US010574131B2

(12) United States Patent
Lutze

(10) Patent No.: US 10,574,131 B2
(45) Date of Patent: Feb. 25, 2020

(54) CONVERTER HAVING SHORT-CIRCUIT INTERRUPTION IN A HALF-BRIDGE

(71) Applicant: Siemens Aktiengesellschaft, Munich (DE)

(72) Inventor: Marcel Lutze, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 175 days.

(21) Appl. No.: 15/568,374

(22) PCT Filed: Apr. 13, 2016

(86) PCT No.: PCT/EP2016/058045
§ 371 (c)(1),
(2) Date: Oct. 20, 2017

(87) PCT Pub. No.: WO2016/169817
PCT Pub. Date: Oct. 27, 2016

(65) Prior Publication Data
US 2018/0145580 A1 May 24, 2018

(30) Foreign Application Priority Data
Apr. 21, 2015 (DE) .................. 10 2015 207 187

(51) Int. Cl.
*B64D 35/02* (2006.01)
*H02M 1/32* (2007.01)
(Continued)

(52) U.S. Cl.
CPC .............. *H02M 1/32* (2013.01); *B64D 35/02* (2013.01); *H02M 1/088* (2013.01); *H02M 5/458* (2013.01);
(Continued)

(58) Field of Classification Search
CPC ........ B64D 35/02; H02M 1/088; H02M 1/32; H02M 5/458; H02M 2001/325; H02P 27/06
(Continued)

(56) References Cited

U.S. PATENT DOCUMENTS 5,123,746 A * 6/1992 Okado ................ H02M 7/5387
363/37
5,444,287 A * 8/1995 Bezama .............. H01L 23/5256
257/467
(Continued)

FOREIGN PATENT DOCUMENTS

CN          1052401      6/1991
CN         103427605    12/2013
(Continued)

OTHER PUBLICATIONS

Office Action dated Feb. 27, 2019 issued in Chinese Patent Application No. 201680023667.0.

*Primary Examiner* — Thienvu V Tran
*Assistant Examiner* — Brian K Baxter
(74) *Attorney, Agent, or Firm* — Cozen O'Connor

(57) ABSTRACT

A method for controlling a converter, wherein positive and negative lines of an intermediate circuit are connected by a half-bridge to an alternating voltage phase conductor via semiconductor switches, where each semiconductor switch has a series connected separate fuse, and where the method includes detecting a defective semiconductor switch that permanently remains in an electrically conductive state and incrementally melting the fuse of the defective semiconductor switch by short-circuiting the positive and the negative lines to each other multiple times via the defective semiconductor switch and via at least two others of the semiconductor switches, during which each short circuit lasts only one pulse duration Tsoa that is shorter than a melting (Continued)

duration Ta needed by the fuse to melt in the event of a continuous short circuit such that the converter robustly reacts in the event of a permanent short circuit caused by one of the semiconductor switches.

12 Claims, 5 Drawing Sheets

(51) Int. Cl.
    *H02M 1/088* (2006.01)
    *H02M 5/458* (2006.01)
    *H02P 27/06* (2006.01)

(52) U.S. Cl.
    CPC ....... *H02P 27/06* (2013.01); *H02M 2001/325* (2013.01)

(58) Field of Classification Search
    USPC .......................................................... 307/9.1
    See application file for complete search history.

(56) References Cited

U.S. PATENT DOCUMENTS

| | | | |
|---|---|---|---|
| 5,571,985 A * | 11/1996 | Ritter | ............... F42D 1/055 102/217 |
| 5,663,858 A | 9/1997 | Etter | |
| 9,698,642 B1 * | 7/2017 | Goessling | ................ H02K 3/28 |
| 2006/0289898 A1 * | 12/2006 | Kono | ................... H01L 23/5256 257/209 |
| 2011/0116299 A1 * | 5/2011 | Obayashi | ............... G11C 17/16 365/96 |
| 2011/0266986 A1 * | 11/2011 | Christmann | ......... H02H 7/0833 318/400.21 |
| 2012/0026822 A1 * | 2/2012 | Kanda | .................... G11C 17/16 365/225.7 |
| 2013/0176752 A1 | 7/2013 | Schelenz et al. | |
| 2014/0117759 A1 * | 5/2014 | Reason | .................. H02H 3/025 307/31 |
| 2015/0288264 A1 * | 10/2015 | Tojima | .................... H02P 25/08 318/701 |
| 2016/0261205 A1 * | 9/2016 | Kolar | .................... H02M 5/458 |
| 2016/0322893 A1 | 11/2016 | Schinzel et al. | |
| 2017/0197509 A1 * | 7/2017 | Lehnert | .................... H02H 3/05 |
| 2017/0197730 A1 * | 7/2017 | Lutze | .................... H02M 5/458 |

FOREIGN PATENT DOCUMENTS

| | | |
|---|---|---|
| DE | 4435255 | 4/1996 |
| DE | 102013226795 | 6/2015 |
| WO | WO2015/090735 | 6/2015 |
| WO | WO2016005166 | 1/2016 |

\* cited by examiner

CONVERTER HAVING SHORT-CIRCUIT INTERRUPTION IN A HALF-BRIDGE

CROSS-REFERENCE TO RELATED APPLICATIONS

This is a U.S. national stage of application No. PCT/EP2016/058045 filed 13 Apr. 2016. This application claims the priority of German application No. DE 102015207187 filed Apr. 21, 2015, the content of which is incorporated herein by reference in its entirety.

BACKGROUND OF THE INVENTION

1. Field of the Invention

The invention relates to a method for controlling a converter including a half-bridge, via which an intermediate circuit is interconnected with an alternating voltage phase conductor, and a converter, which can be controlled in accordance with the method, and to an aircraft having the converter.

2. Detailed Description of the Related Art

With a converter, an alternating voltage at a preset frequency can be converted into an alternating voltage with an adjustable frequency. To this end, the preset alternating voltage is converted, via a rectifier, into a direct voltage that is delivered to an intermediate circuit. From this intermediate circuit, via an inverter, the alternating voltage with an adjustable frequency can be generated. The two alternating voltages can be delivered in a multi-phase form respectively, i.e., for example, in a three-phase AC system.

With the converter, for example, an electric generator can be coupled to an electric drive motor. Such an application is possible, for example, in an aircraft having an electric propeller drive. In this arrangement, a combustion engine drives the generator, the alternating voltage of which is converted into an alternating voltage for the electric drive motor via the converter. The drive motor drives the propeller of the aircraft.

The converter for the operation of the drive motor for the propeller of an aircraft should be as fail-safe as possible. Further safety-relevant devices also require a fail-safe converter.

A malfunction occurs as follows. In a converter, the intermediate circuit can be connected by a half-bridge with one alternating voltage phase conductor respectively. Such a half-bridge can be a constituent of the rectifier or the inverter. A potential malfunction can occur in the operation of the converter, whereby a semiconductor switch in the half-bridge becomes permanently electrically conductive, i.e., can no longer be switched by a control signal to an electrically blocking or non-conducting state. The positive line or the negative line will then be permanently short-circuited by the alternating voltage phase conductor. This generally requires an interruption in service and the execution of a repair, for example, replacement of the half-bridge. In an aircraft, this is not possible during flight. Further safety-relevant applications may likewise dictate that the initial continuation of the operation of the converter must be possible, even with a defective semiconductor switch.

SUMMARY OF THE INVENTION

It is an object of the invention therefore to provide a converter with a fail-safe performance.

This and other objects and advantages are achieved in accordance with the invention by a converter which, in the manner described, incorporates an intermediate circuit for the delivery of a DC voltage. The converter moreover comprises at least one half-bridge, by which a positive line and a negative line of the intermediate circuit are respectively connected with one and the same alternating voltage phase conductor. The half-bridge is specifically arranged in an inverter of the converter.

In order to improve fail-safe performance, within the converter in accordance with the invention, the positive line and the negative line of the intermediate circuit are respectively connected by the half-bridge to the alternating voltage phase conductor, not only via a single semiconductor switch, but via a plurality of semiconductor switches. Each semiconductor switch can be configured, for example, based on an insulated gate bipolar transistor (IGBT) or a metal oxide semiconductor field effect transistor (MOSFET). Moreover, each semiconductor switch has its own dedicated fuse, connected in series with the circuit path. In other words, a respective fuse is arranged up-circuit or down-circuit of each semiconductor switch. In other words, only the electric current on that circuit path flows in the fuse. In the aforementioned semiconductor switches, the circuit path is the drain-source path. Another circuit path is a collector-emitter path.

The converter moreover comprises a control apparatus that can comprise, for example, a microcontroller or a microprocessor. The control apparatus is configured to control the semiconductor switches. To this end, the control apparatus is configured to execute the following method in accordance with the invention.

By the method in accordance with the invention, the presence in the converter of a defective semiconductor switch is detected, whereby the semiconductor switch is permanently blocked in an electrically conductive state. In other words, the semiconductor switch can no longer be switched to the electrically blocking state. If a defective semiconductor switch is detected, then the incremental melting of the fuse of the defective semiconductor switch ensues. To this end, a plurality of sequential short-circuits are generated between the positive line and the negative line of the intermediate circuit. This proceeds via the defective semiconductor switch, and at least two further semiconductor switches on the half-bridge. The positive line and the negative line respectively are only short-circuited for a pulse duration Tsoa that is shorter than a melting duration Ta required by the fuse to melt in the event of a continuous short-circuit. The short-circuit current is interrupted between each short-circuit. In other words, the fuse is subject to heat-up via sequential current pulses, respectively generated by the short-circuit, in a step-wise or incremental manner, until the fuse melts or forms an electrically-insulating contact gap. By the melting of the fuse, the flow of an electric current in the defective semiconductor switch is then ultimately blocked or prevented.

The invention has an advantage, in that the minimum of two further semiconductor switches, via which the short-circuit current must also be routed in the event of the melting of the fuse, can be operated in a protective manner. It is not necessary for the short-circuit current to be routed in a continuous or uninterrupted manner via the minimum of two further semiconductor switches until the fuse trips or melts, i.e., for the entire melting duration Ta of the fuse. Instead, in the interim, the minimum of two further semiconductor switches can be switched to the blocking state, such that the minimum of two further semiconductor switches can cool down, or heat can be dissipated in the respective semiconductor switch. Specifically, the pulse duration Tsoa is shorter than or equal to the time interval that is described as the safe operation area (or "SOA"). This is the time interval up to which the semiconductor switch, in the electrically conductive state, can conduct a short-circuit current at a given DC voltage on the intermediate circuit, without sustaining damage itself. The safe operation area can be identified, for example, from a data sheet for the semiconductor switches.

In an embodiment a pulse pause Tp is provided between each short-circuit, which is shorter than a thermal time constant of the fuse. During the pulse pause Tp, such that no short-circuit current flows in the minimum of two further semiconductor switches. The pulse pause Tp is sufficiently short to prevent the excessive cooling of the fuse. In other words, via a plurality of current pulses, the fuse can be successfully heated and melted. This further embodiment is based upon the knowledge that the thermal time constant of a fuse is greater than that of a semiconductor switch, specifically a barrier layer of the semiconductor switch, which is subject to heat-up, together with the fuse, upon the conduction of the short-circuit current. In other words, the semiconductor switch cools more rapidly than the fuse. If the pulse pause Tp is greater than the time constant of the barrier layer, but smaller than the time constant of the fuse, then the at least one further semiconductor switch can be operated in a protective manner, while the fuse can be caused to melt or trip. The time constant can, for example, be the half-time value or the cooling time to 1/e of the starting temperature, where "e" is Euler's constant.

In accordance with a further embodiment, the defective semiconductor switch is detected via a driver circuit that controls the semiconductor switch. A driver circuit of this type is known from the prior art as a gate driver. In order to permit the detection of the defective semiconductor switch via such a driver circuit, in accordance with the further embodiment, an electrical voltage drop across the defective semiconductor switch is compared with a target voltage value. If the voltage remains lower than the target voltage value, then notwithstanding the generation on the control input (e.g., on the gate) of the semiconductor switch of a control signal for blocking the semiconductor switch, a defect on the semiconductor switch is signaled. Additionally or alternatively, a voltage drop across one of the further semiconductor switches can be evaluated. In the event of a short-circuit, a predefined target value is exceeded here.

In accordance with a further embodiment, further to the melting of the fuse, an arc in the fuse is suppressed by the at least two further semiconductor switches. This has an advantage, in that the arc can be actively controlled.

In a further embodiment, the execution of the method during the operation of the converter is permitted, and thus during the operation of an electrical load via the converter. The defective semiconductor switch is detected during operation. For the melting of the fuse, a predefined pulse pattern is activated, by which the at least two further semiconductor switches are actuated. During this time, for example, the load can run under no-load conditions, in the case, for example, of an electric drive motor.

In accordance with a further embodiment, the converter, further to the melting of the fuse, continues to operate with the defective semiconductor switch. To this end, the parallel-connected semiconductor switches of the half-bridge are then employed. The converter can thus continue to operate. Thus, for example, the safe landing of an aircraft can be made possible.

In a further embodiment, the pulse duration Tsoa lies within a range of 8 microseconds to 15 microseconds. The safe and/or protective operation of the semiconductor switches is achieved in this case, even in the event of a short-circuit current.

The converter in accordance with the invention is specifically a 2-level converter.

The invention further comprises an aircraft, which is specifically configured as a fixed-wing aircraft. The aircraft in accordance with the invention has at least one electric drive motor for driving a respective propeller of the aircraft. Such an aircraft is also described as an E-plane. In the event that the aircraft is configured as a rotary wing aircraft, the propeller is the rotor of the aircraft. The at least one drive motor of the aircraft is coupled to an electric generator via a converter. In this case, the converter constitutes a form of embodiment of the converter in accordance with the invention. The aircraft in accordance with the invention has an advantage, in that the safe onward flight of the aircraft is possible, in the event of a defective semiconductor switch.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is described hereinafter, which.

DETAILED DESCRIPTION OF THE EXEMPLARY EMBODIMENTS

The exemplary embodiment described hereinafter constitutes a preferred form of embodiment of the invention. In the exemplary embodiment, the described constituent elements of the form of embodiment each represent individual characteristics of the invention, which are to be considered independently of each other and which respectively also further develop the invention in a mutually independent manner and thus also, individually and in a combination other than that represented, are to be considered as an element of the invention. Moreover, the form of embodiment described can be expanded by the inclusion of further of the above-described characteristics of the invention.

In the figures, functionally equivalent components are identified by the same respective reference symbols.

Figure 1:
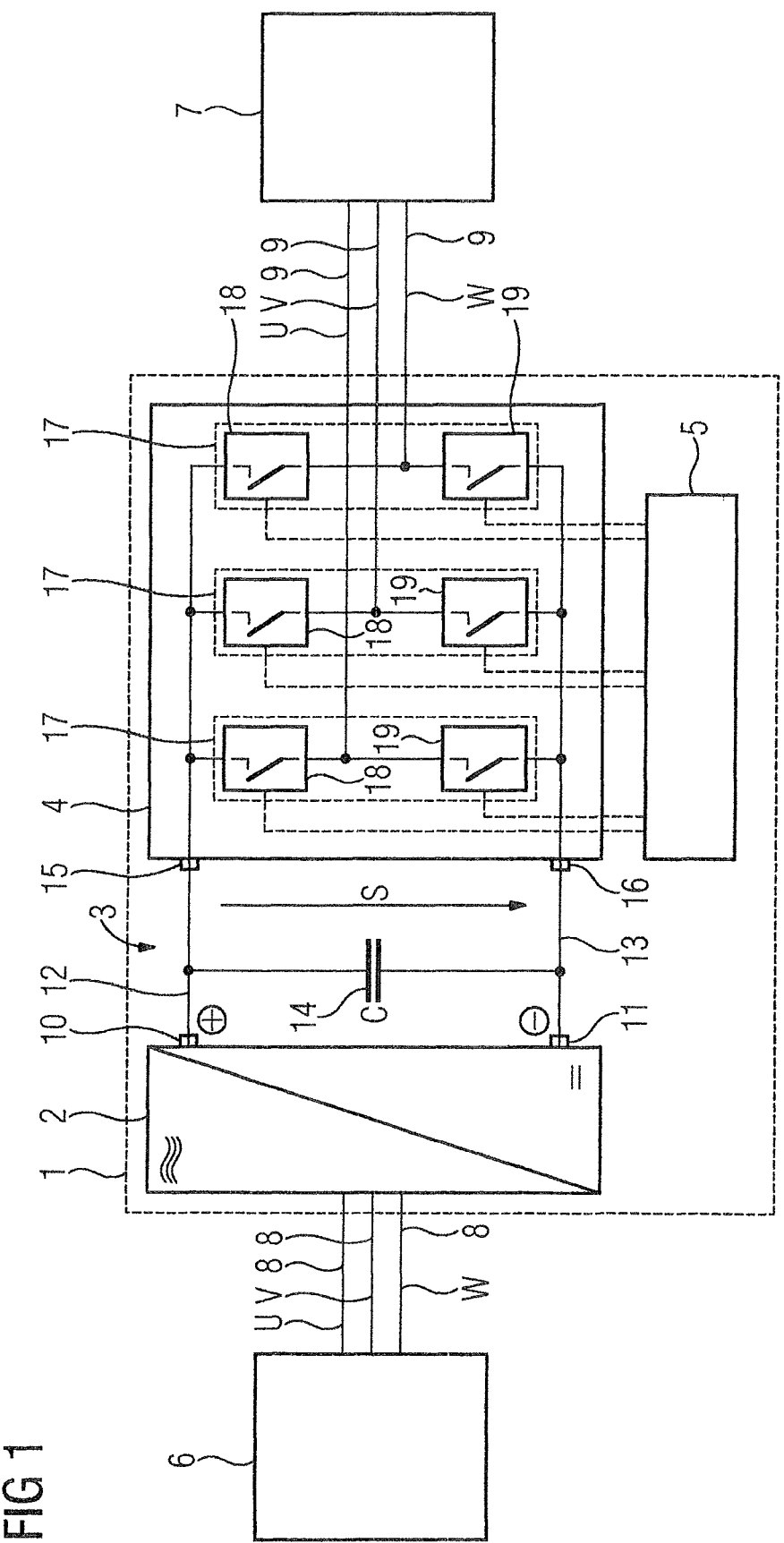
FIG. 1 shows a schematic representation of one form of embodiment of the converter in accordance with the invention.

FIG. 1 shows a converter 1, which comprises a rectifier 2, an intermediate circuit 3, an inverter 4 and a control apparatus 5. With the converter 1, a voltage source 6, such as an electric generator, and an electrical load 7, such as an electric motor, can be mutually coupled. The voltage source 6 can be connected via phase conductors 8 to the rectifier 2. The load 7 can be connected to the inverter 4 via phase conductors 9. Via the phase conductors 8, 9, respective alternating voltages of different phases can be transmitted. In FIG. 1, the phases are represented by the conventional phase symbols U, V, W.

From the alternating voltages on the phase conductors 8, a DC voltage S can be generated by the rectifier 2, which is injected into the intermediate circuit 3 at a positive output 10 and a negative output 11 of the rectifier 2. The intermediate circuit 3 can comprise a positive line 12 that is connected to the positive output 10, and a negative line 13 that is connected to the negative output 11. The positive line 12 and the negative line 13 can be interconnected via an intermediate circuit capacitor 14, which delivers an intermediate circuit capacitance C. The positive line 12 can be connected to a positive terminal 15 of the inverter 4. The negative line 13 can be connected to a negative terminal 16 of the inverter 4. The positive line 12, the negative line 13 and the phase conductors 8, 9 can be respectively configured, for example, as a wire or a conductor rail.

The inverter 4 can incorporate half-bridges 17, via which both the positive line 12 and the negative line 13 are respectively interconnected or bonded with another of the phase conductors 9. To this end, each half-bridge 17 can comprise two switch arrangements 18, 19. The switch arrangement 18 is also described as the high-side circuit, and the switch arrangement 19 as the low-side circuit. In each half-bridge 17, the switch arrangement 18, in an exemplary manner, connects the positive line 12 to the respective phase conductor 9. The switch arrangement 19 connects the negative line 13 to the same phase conductor 9. By the alternating switching of the switch arrangements 18, 19, in a manner which is known per se, from the DC voltage S, an alternating voltage is injected or generated on the phase conductor 9.

For control of the switch arrangements 18, 19 of the half-bridges 17, control terminals of the switch arrangements 18, 19 can be coupled to the control apparatus 5. The control apparatus 5 can be partially or fully integrated into the switch arrangements 18, 19. The control apparatus can be partially or fully configured as a separate control unit.

Figure 2:
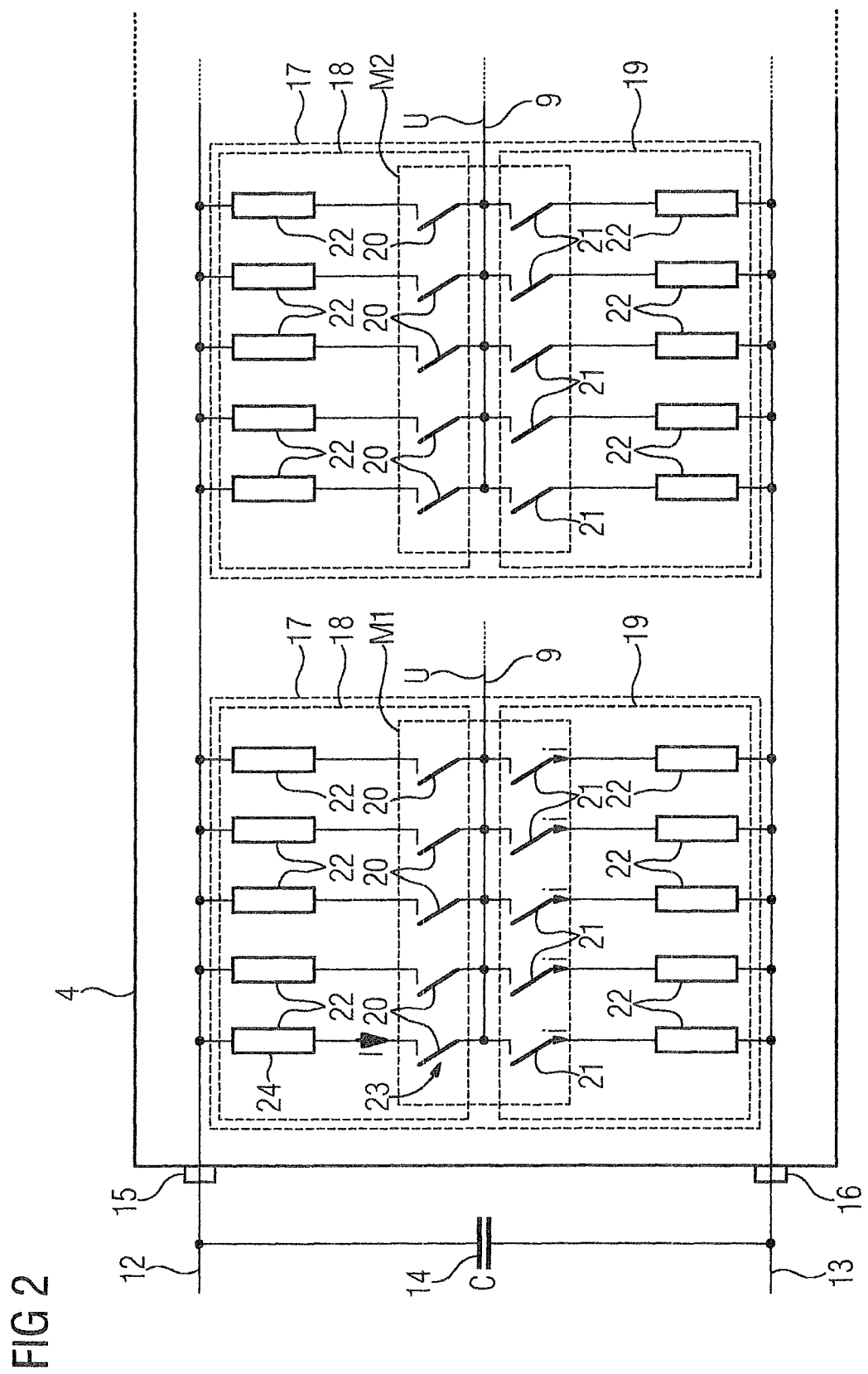
FIG. 2 shows a schematic representation of a half-bridge of the converter of FIG. 1.

FIG. 2 shows a section of the inverter 4 in greater detail. In the inverter 4, the switch arrangements 18, 19 each comprise a plurality of semiconductor switches 20, 21. A dedicated fuse 22 is connected in series with each semiconductor switch 20, 21. Each switch arrangement 18, 19 thus comprises a parallel circuit formed from a plurality of series circuits, where each series circuit is constituted of a semiconductor switch 20 and a fuse 22, or of a semiconductor switch 21 and a fuse 22. As a result of the parallel circuit connection, the current-carrying capacity of each switch arrangement 18, 19 is greater than that of an individual semiconductor switch 20, 21. Each semiconductor switch 20, 21 can be configured, for example, as an IGBT or a MOSFET. The semiconductor switches 20, 21 of a half-bridge 17 can be provided in the form of semiconductor modules M1, M2, and thus configured, for example, on a common semiconductor substrate.

The fuses 22 can have a tripping time or melting duration Ta that is greater than a maximum permissible on-time of the semiconductor switches 20, 21 in the event of a short-circuit. The maximum on-time Tsoa in the safe operation area of the semiconductor switches 20, 21 can lie within a range of 8 microseconds to 15 microseconds. For example, the safe operation area can have a value of 10 microseconds.

For further describing the exemplary embodiment, it is assumed that one of the semiconductor switches 20 is defective. Hereinafter, the defective semiconductor switch is designated as 23. As a result of the defect, the defective semiconductor switch 23 is continuously electrically conductive, i.e., in the example illustrated, the positive line 12 is permanently electrically connected to, or short-circuited by, the phase conductor 9 of phase U.

During the operation of the converter 1, the converter 1 converts the alternating voltages in the phase conductors 8 into alternating voltages, which are delivered to the load 7 via the phase conductors 9. For example, via a driver circuit of the defective semiconductor switch 23, i.e., a gate driver, it can be detected by reference to the switch voltage that the semiconductor switch 23 is defective. This can be signaled by the control apparatus 5, for example, via a signal. Alternatively, by reference to the switch voltages of the non-defective semiconductor switches, a permanently conductive semiconductor switch can also be identified, as the short-circuit current causes a rise in voltage.

In response to the signal, the control apparatus 5 executes a process whereby the fuse 24 associated with the defective semiconductor switch 23 is tripped or melted, such that electrical separation or electrical isolation is effected via the fuse 24. Consequently, in the example, the positive line 12 is electrically isolated from the phase conductor 9, whereas the defective semiconductor switch 23 is permanently electrically conductive.

In the method, by the switch-on of the non-defective semiconductor switches 21, i.e., the semiconductor switches in that switch arrangement 19 in which the defective semiconductor switch 23 is not located, the defective semiconductor switch 23, via its fuse 24, is isolated from the intermediate circuit 3. By closing the semiconductor switches 21, i.e., by the switching of the semiconductor switches 21 to the electrically conductive state, the positive line 12 with the negative line 13 via the defective semiconductor switch 23 on one side, and the semiconductor switches 21 on the other side, is electrically short-circuited. A short-circuit current I flows therein. The remaining semiconductor switches 20 of the switch arrangement 18, in which the defective semiconductor switch 23 is located, are switched to an electrically blocking state, i.e., an open state. As a result, the full short-circuit current I is routed through the fuse 24 and the defective semiconductor switch 23. In the switch arrangement 19, the short-circuit current I is divided between the semiconductor switches 21. As a result, melting or tripping of the fuses 22 is prevented.

In order to prevent damage to the non-defective semiconductor switches 21 upon the tripping of the fuse 24, the short-circuit current I must be switched off again within the safe operation area Tsoa. This means that the short-circuit current I is only generated for a pulse duration Tsoa by closing the semiconductor switches 21. In the example, the pulse duration Tsoa is 10 microseconds, which corresponds to the safe operation area of the semiconductor switches 21. However, the tripping of the fuse 24 in response to a DC voltage, such as the DC voltage S, may require longer than the pulse duration Tsoa. This melting duration Ta of the fuse can be longer than one millisecond, specifically longer than 5 milliseconds. This is significantly too long for the semiconductor switches 21 with the safe operation area corresponding to a pulse duration Tsoa of, for example, 10 microseconds.

Figure 3:
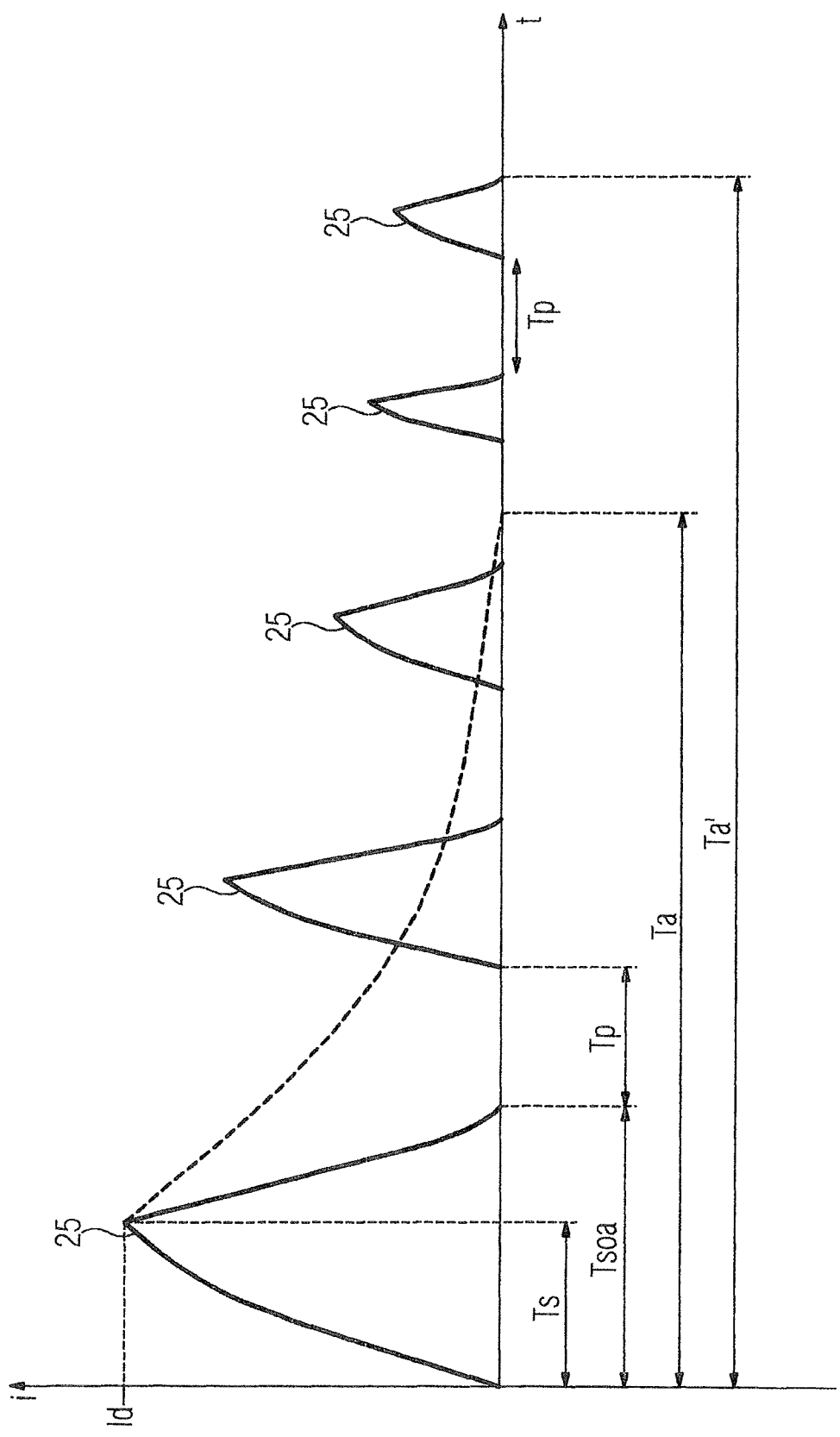
FIG. 3 shows a diagram of a schematic characteristic of a short-circuit current, of the type associated with the half-bridge of FIG. 2 during the execution of one form of an embodiment of the method in accordance with the invention.

The temporal relationships are further illustrated in FIG. 3. In FIG. 3, the current strength i of the partial currents flowing in one of the semiconductor switches 21 during execution of the method in accordance with the invention is plotted against time t. The short-circuit current I is divided between the semiconductor switches 21, where it is conducted as a partial current Id. The current strength of the partial current i is increased to the maximum partial current Id in this case, which occurs on the as yet undamaged fuse 24. In the example, it is assumed that, after a response time Ts, the signal is received by the control apparatus 5, by which the defective semiconductor switch 23 is signaled. After the pulse duration Tsoa, the semiconductor switches 21 are switched off, or switched to the blocking state. In order to trip the fuse 24, conversely, the melting duration Ta is required.

Between each switching pulse or short-circuit current 25, the semiconductor switches 21 are switched to the open state for the duration of a pulse pause Tp.

As a result, the still functional semiconductor switches 21, which are required to conduct the short-circuit current I, are not overloaded upon tripping of the fuse 24. The fuse 24 is melted incrementally within the pulse duration Tsoa by a high short-circuit current I, applied with each short-circuit 25, where the short-circuit current is then switched off after each increment while still within the safe operation area, further to the pulse duration Tsoa. The normally executed switch-off process is indicated in FIG. 3 by the dashed line, which indicates a resulting melting duration Ta that would be greater than the safe operation area Tsoa.

The thermal time constant of the fuse 24 is greater than that of the semiconductor switches 21. Consequently, only minor cooling of the fuse 24 occurs within the pulse pause Tp. Thus, further to the incipient melting or the partial melting of the fuse 24, the insulating clearance in the fuse 24 can be incrementally increased with each short-circuit 25, where the non-defective semiconductor switch repeatedly switches the short-circuit current I on and off. The turn-off time is thus extended, i.e., the melting duration Ta, and the illustrated melting duration Ta' is achieved. As a short-circuit is repeatedly applied to the semiconductor switches 21 in a cyclical manner, these are operated in a more protective manner than if the short-circuit current were to be applied continuously throughout the melting duration Ta.

Further to the melting of the fuse 24, an arc can be generated in the fuse 24, which can be directly influenced by switching of the semiconductor switches 21. By the repeated switch-on of the semiconductor switches 21, the breakdown of the fuse thus continues until the insulating clearance has been constituted. By this procedure, the still active semiconductor switches 21 continue to operate in their safe operation area (SOA), even in the event the fuse 24 is tripped.

Figure 4:
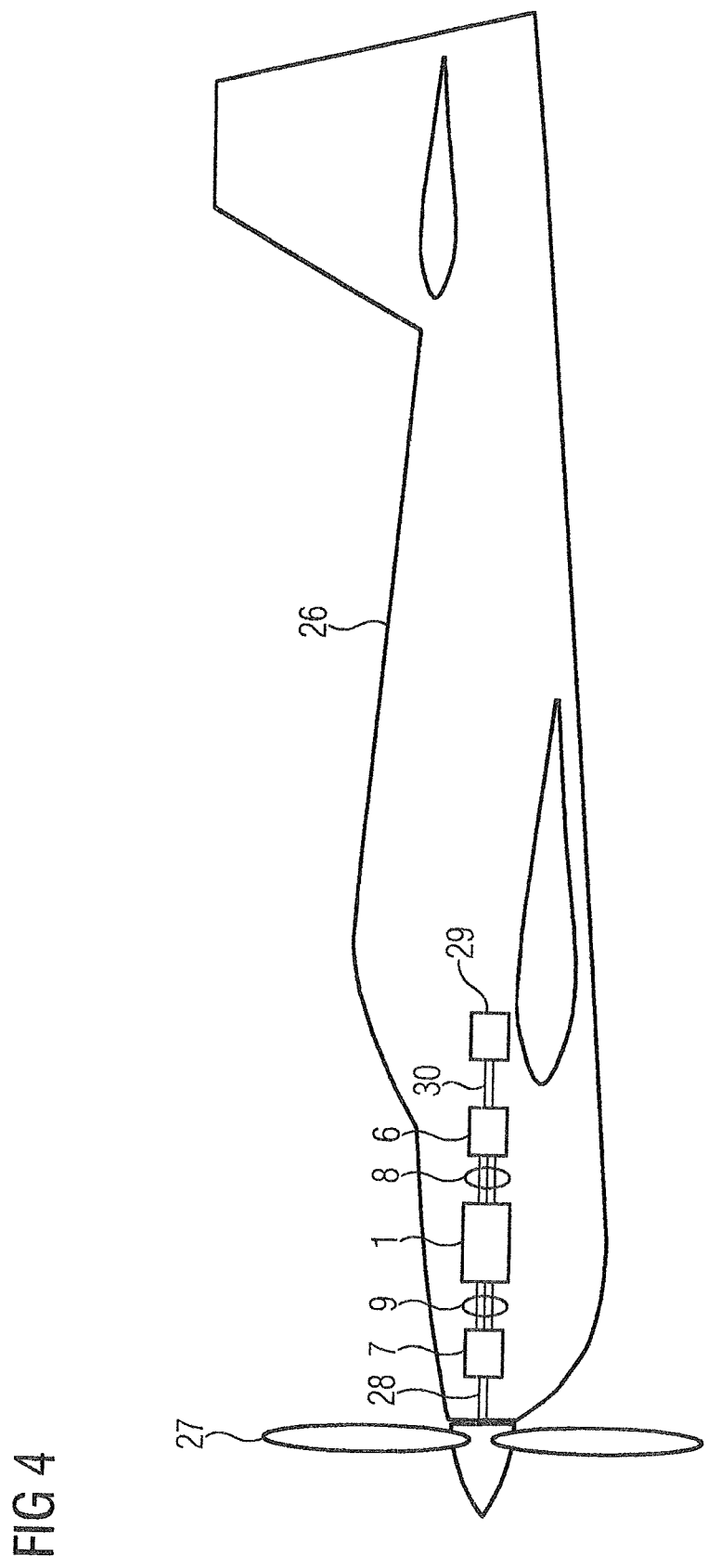
FIG. 4 shows a schematic representation of one form of embodiment of the aircraft in accordance with the invention.

FIG. 4 illustrates how the converter 1 can be provided in an aircraft 26, in an exemplary manner. FIG. 4 represents a fixed-wing aircraft 26, in which a propeller 27 can be driven by the load 7. With the load 7, the propeller 27 is rotated via a shaft 28. In the example, the load 7 is an electric drive motor, i.e., an electrical machine that is operated as a motor. The energy for driving the propeller 27 can be obtained from a combustion engine, such as a gasoline engine or a diesel engine. Via a shaft 30, the combustion engine 29 can drive the voltage source 6 which, to this end, is configured as an electric generator. As an electric generator, an electrical machine operating in generator mode can be provided. A speed of the shaft 30 is independent of a speed of the shaft 28, in this case. To this end, the alternating voltage generated by the voltage source 6 in the manner described is converted by the converter 1 into an alternating voltage, which can be injected into the load 7 via the alternating voltage phase conductors 9. A switching frequency of the switch arrangements 18, 19 is set by the control apparatus 5 in relation to a rotational speed of the propeller 27. The rotational speed can, for example, be dictated or set by a pilot, via an (unrepresented) operator control element.

Overall, the example illustrates how the invention can deliver a method for the tripping of semiconductor fuses in an E-plane converter equipped with fuses.

Figure 5:
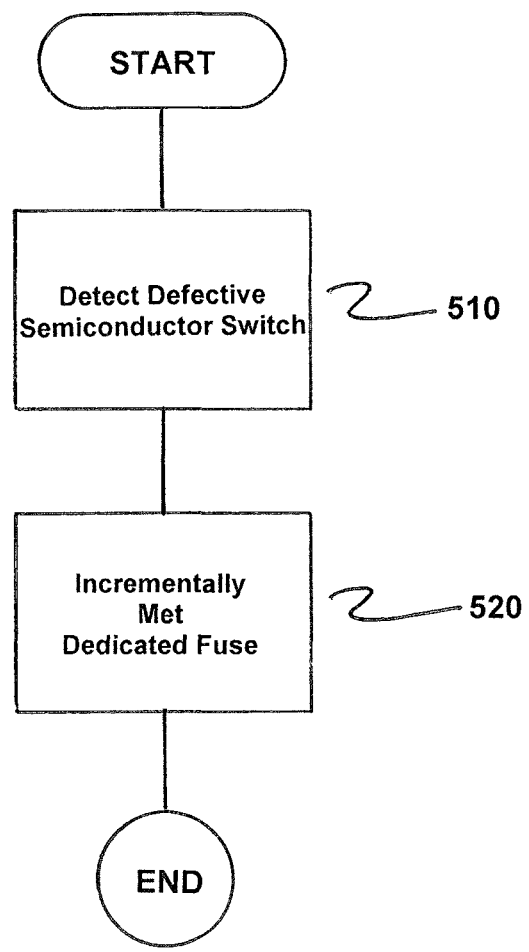
FIG. 5 is a flow chart of the method in accordance with the invention.

FIG. 5 is a flowchart of a method for controlling a converter 1, where a positive line 12 and a negative line 13 of an intermediate circuit 3 are respectively connected by a half-bridge 17 to an alternating voltage phase conductor 9 via a plurality of semiconductor switches 20, 21, 23, and where each semiconductor switch 20, 21, 23 of plurality of semiconductor switches has a respective dedicated fuse 22, 24 connected in series in a circuit path.

The method comprises detecting a defective semiconductor switch 23 which is permanently blocked in an electrically conductive state, as indicated in step 510.

Next, a dedicated fuse 24 of the detected defective semiconductor switch 23 is incrementally melted, as indicated in step 520. This is achieved by repeated sequential short-circuiting of the positive line and negative lines 12, 13 via the defective semiconductor switch 23 and at least two further semiconductor switches 21 for a respective pulse duration Tsoa that is shorter than a melting duration Ta required by the fuse to melt in an event of a continuous short-circuit.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling a converter, a positive line and a negative line of an intermediate circuit being respectively connected by a half-bridge to an alternating voltage phase conductor via a plurality of semiconductor switches, each semiconductor switch of plurality of semiconductor switches having a respective dedicated fuse connected in series in a circuit path, the method comprising:
   detecting a defective semiconductor switch which is permanently blocked in an electrically conductive state; and
   melting a dedicated fuse of the detected defective semiconductor switch incrementally, by repeated closure of at least two non-defective semiconductor switches of the plurality of switches to sequentially short-circuit the positive line and negative lines via the defective semiconductor switch and the at least two non-defective further semiconductor switches of the plurality of switches for a respective pulse duration which is shorter than a melting duration required by the fuse to melt in an event of a continuous short-circuit.

2. The method as claimed in claim 1, wherein a pulse pause is provided between each short-circuit, said pulse being shorter than a thermal time constant of the dedicated fuse.

3. The method as claimed in claim 1, wherein the defective semiconductor switch is detected via a driver circuit which controls the defective semiconductor switch; and wherein the driver circuit compares an electrical voltage drop across one of (i) the defective semiconductor switch with a target voltage value and (ii) across one of the at least two non-defective further semiconductor switches with the target voltage value.

4. The method as claimed in claim 1, wherein, in addition to melting the fuse, an arc in the fuse is suppressed by the at least two non-defective further semiconductor switches.

5. The method as claimed in claim 1, wherein the defective semiconductor switch is detected with the converter in-service, during operation of an electrical load via the converter, and a predefined pulse pattern is activated to melt the fuse, by which the at least two non-defective further semiconductor switches are actuated.

6. The method as claimed in claim 1, wherein the converter, in addition to melting the fuse, continues to operate with the defective semiconductor switch.

7. The method as claimed in claim 1, wherein the respective pulse duration lies within a range of 8 microseconds to 30 microseconds.

8. A converter, comprising:
an intermediate circuit for delivering a DC voltage;
at least one half-bridge, by which a positive line and a negative line of the intermediate circuit are respectively connected to an alternating voltage phase conductor via a plurality of semiconductor switches, each semiconductor switch of the plurality of semiconductor switches having a respective dedicated fuse connected in series in a circuit path; and
a control apparatus for controlling the semiconductor switches, the control apparatus being configured to:
detect a defective semiconductor switch which is permanently blocked in an electrically conductive state; and
melt a dedicated fuse of the detected defective semiconductor switch incrementally, by repeated closure of at least two non-defective semiconductor switches of the plurality of switches to sequentially short-circuit the positive line and negative lines via the defective semiconductor switch and the at least two non-defective further semiconductor switches of the plurality of switches for a respective pulse duration which is shorter than a melting duration required by the fuse to melt in an event of a continuous short-circuit.

9. The converter as claimed in claim 8, wherein each semiconductor switch of the plurality of semiconductor switches is respectively constituted as an IGBT or a MOSFET.

10. An aircraft, specifically a fixed-wing aircraft, comprising:
at least one electric drive motor for driving a respective propeller of the aircraft;
wherein the at least one drive motor is coupled to an electric generator via the converter as claimed in one claim 9.

11. An aircraft, specifically a fixed-wing aircraft, comprising:
at least one electric drive motor for driving a respective propeller of the aircraft;
wherein the at least one drive motor is coupled to an electric generator via the converter as claimed in one claim 8.

12. The aircraft of claim 11, wherein the aircraft is a fixed-wing aircraft.

* * * * *